United States Patent [19]

Harada et al.

[11] Patent Number: 4,460,696

[45] Date of Patent: Jul. 17, 1984

[54] ACID-SOLUBLE GLASS FOR MAKING FLEXIBLE OPTICAL FIBER BUNDLE

[75] Inventors: Yuho Harada, Ohmiya; Shigeo Kuwayama, Odawara, both of Japan

[73] Assignee: Fuji Photo Optical Co., Ltd., Saitama, Japan

[21] Appl. No.: 436,994

[22] Filed: Oct. 27, 1982

[30] Foreign Application Priority Data

Oct. 28, 1981 [JP] Japan ................................ 56-172414

[51] Int. Cl.³ ............................................. C03C 13/00
[52] U.S. Cl. ........................................ 501/37; 65/4.2; 65/31; 350/96.31; 350/96.24; 501/67; 501/79; 501/903
[58] Field of Search ................. 501/37, 67, 79; 65/31, 65/4.2; 350/96.31, 96.24

[56] References Cited

U.S. PATENT DOCUMENTS

| | | | |
|---|---|---|---|
| 3,554,721 | 1/1971 | Gardner | 65/4.2 |
| 3,624,816 | 11/1971 | Strack | 65/31 |
| 3,674,452 | 7/1972 | Strack | 65/4.21 |
| 4,112,170 | 9/1978 | Rauscher | 501/77 |
| 4,175,940 | 11/1979 | Siegmund | 65/4.2 |
| 4,275,951 | 6/1981 | Beales et al. | 350/96.31 |
| 4,277,270 | 7/1981 | Krohn | 350/96.31 |

FOREIGN PATENT DOCUMENTS

| | | | |
|---|---|---|---|
| 53-38623 | 10/1978 | Japan . | |
| 57-38343 | 3/1982 | Japan . | |
| 57-61643 | 4/1982 | Japan . | |
| 2084565A | 4/1982 | United Kingdom | 501/37 |

Primary Examiner—Helen M. McCarthy
Attorney, Agent, or Firm—Eyre, Mann, Lucas & Just

[57] ABSTRACT

An acid-soluble glass for use in making a flexible optical fiber bundle, which comprises the following composition:

20.0 mol % $< SiO_2 <$ 48.0 mol %
25.0 mol % $< B_2O_3 <$ 50.0 mol %
5.0 mol % $\leq BaO \leq$ 6.0 mol %
7.0 mol % $< Na_2O$, $K_2O$, or $Li_2O$, or total of the two or more thereof $<$ 18.0 mol %
71.0 mol % $< SiO_2 + B_2O_3 + BaO <$ 80.0 mol %
7.4 mol % $< ZnO <$ 12.0 mol %
1.8 mol % $< Al_2O_3 <$ 7 mol %

The acid-soluble glass exhibits a high solubility in an acid, a high resistance to water, and a high viscosity at the fiber-forming temperature.

5 Claims, No Drawings

ACID-SOLUBLE GLASS FOR MAKING FLEXIBLE OPTICAL FIBER BUNDLE

BACKGROUND OF THE INVENTION

1. Field of the Invention

This invention relates to a composition of an acid-soluble glass for use in making a bundle of flexible optical fibers.

2. Description of the Prior Art

When a bundle of optical fibers is used as an image guide, the optical fibers must be arranged so that the ends thereof correspond to the other ends thereof in one-to-one relation.

Particularly, when the optical fiber bundle for the image guide is used for an endoscope or the like, the optical fibers must be fixed together with one another at both ends thereof, and the intermediate portion of the optical fiber bundle must be flexible. Various methods have been proposed to make an optical fiber bundle having the fixed ends and the flexible intermediate portion.

For example, it is known to make a flexible optical fiber bundle for use as an image guide by introducing a core glass having a relatively high refractive index into an inner crucible of a double crucible and introducing a covering glass having a relatively low refractive index into the outer crucible, heating the double crucible to an appropriate temperature, drawing both glasses from a double nozzle positioned at the bottom of the double crucible so as to cover the core glass by the covering glass, closely looping the obtained optical fiber in one row, and fixing a portion of the formed loop with an adhesive. Then, another optical fiber is formed and closely looped in one row in the same way as described above, and fixed with an adhesive at the fixed section of the previously formed loop. The aforesaid operations are repeated to obtain a loop-like optical fiber bundle having a desired thickness, approximately the center of the fixed section of the loop-like optical fiber bundle is cut perpendicularly to the length of the optical fibers, and the cut faces are ground or polished. In this method, since a very thin optical fiber having a thickness of, for example, about 20 $\mu$ is formed by one heating operation, the subsequent arrangement work requires high-degree skill for handling an extremely thin optical fiber, and there is risk of the fiber breaking. Thus, this method is disadvantageous in that the image guide can be produced with a low yield and, consequently, is expensive.

It is also known to make an optical fiber bundle by use of an acid-soluble glass. In this method, a core glass having a relatively high refractive index is introduced into the innermost crucible of a triple crucible, a covering glass having a relatively low refractive index into an intermediate crucible, and an acid-soluble glass into the outermost crucible. The whole triple crucible is heated to an appropriate temperature, and the molten glasses are drawn from a triple nozzle positioned at the bottom of the triple crucible so as to cover the core glass by the covering glass and further cover the surface of the covering glass by the acid-soluble glass. In this way, an optical fiber having a diameter of about 200$\mu$ is formed and cut to a length of about 600 mm. Many (e.g. 10,000) fibers thus obtained are bundled, fused together (if necessary, after putting the optical fiber bundle into an acid-soluble glass tube), heated to an appropriate temperature, and stretched until the diameter of each optical fiber reduces to about 1/15. Both ends of the hard optical fiber bundle thus obtained are covered by an acid resistant covering material, and then the whole optical fiber bundle is contacted with an acid (for example, nitric acid) to dissolving out the acid-soluble glass from the intermediate portion of the optical fiber bundle. In this method, since a relatively thick fiber having a thickness of about 200 $\mu$ is handled, the optical fiber arranging work is easier than in the first mentioned method, and there is less risk of the fiber breaking. Further, since the fibers are fused together with heat after they are arranged, there is no risk of the fused fibers breaking. Accordingly, this method can produce an optical fiber bundle with a higher yield and at a lower cost than in the first mentioned method.

However, in the second method mentioned above, since the acid-soluble glass exists in very narrow spaces, the acid resistant covering layer of the optical fiber is eroded and the surface thereof becomes uneven when the acid-soluble glass is dissolved by an acid. As a result, the optical fiber readily breaks, and the life thereof becomes short. In order to eliminate this problem, it has been proposed in U.S. Pat. No. 3,624,816 to use an acid-soluble glass which has a high solubility in acid and which has a composition essentially consisting of about 45% by weight of $B_2O_3$, about 45% by weight of BaO, and about 8% by weight of $La_2O_3$ (or 65.7 mol % of $B_2O_3$, 29.8 mol % of BaO, and 2.5 mol % of $La_2O_3$) However, this acid-soluble glass exhibiting high solubility in an acid has a very low resistance to water, so that the acid-soluble glass is dissolved out during the grinding of the end faces of the optical fiber bundle and it becomes difficult to conduct grinding. Further, since this acid-soluble glass contains much BaO, the viscosity thereof changes greatly due to a change in temperature and the stiffness thereof becomes very low. Accordingly, it is very difficult to making an optical fiber bundle for use as an image guide, which is required to exhibit an extremely high dimensional accuracy, by use of the aforesaid acid-soluble glass.

In order to solve this problem, the inventor has proposed in Japanese Unexamined Patent Publication No. 57(1982)-38343 to improve the water resistance of the acid-soluble glass by adding $SiO_2$ thereto and minimize the change in viscosity due to a change in temperature by reducing the amount of BaO. The inventor also proposed in Japanese Unexamined Patent Publication No. 57(1982)-61643 to obtain an acid-soluble glass exhibiting higher solubility in an acid and better water resistance by further increasing the amount of $SiO_2$ and further reducing the amount of BaO. When a fiber having a triple-layer configuration provided with a covering layer of such an acid-soluble glass by use of a triple crucible, a core glass having, for example, the following composition and properties is put into the innermost crucible:

Composition (expressed in terms of % by weight):
45.0% of $SiO_2$, 11.0% of $K_2O$, 24.0% of PbO, 12.0% of BaO, 5.0% of ZnO, 3.0% of $Al_2O_3$, and 0.7% of $As_2O_3$.

Properties:
refractive index ($n_d$); 1.59062,
transition point; 528° C.,
softening point; 583° C.,
thermal expansion coefficient; $99 \times 10^{-7}$ cm/cm.°C.

Into the intermediate crucible is introduced a covering glass having the following composition and properties:

Composition (expressed in terms of % by weight): 64.0% of $SiO_2$, 16.0% of $Na_2O$, 12.0% of PbO, 5.0% of ZnO, 3.0% of $Al_2O_3$, and 0.7% of $As_2O_3$.

Properties:
refractive index ($n_d$); 1.52852
transition point; 486° C.,
softening point; 533° C.,
thermal expansion coefficient; $98 \times 10^{-7}$ cm/cm.° C.

Into the outermost crucible is introduced the acid-soluble glass disclosed in Japanese Patent Publication No. 53(1978)-38623, Japanese Unexamined Patent Publication No. 57(1982)-3843 or 57(1982)-61643. The whole triple crucible is heated to an appropriate temperature, e.g. a temperature between 1,000° C. and 1,100° C., and the glasses are drawn from the triple nozzle positioned at the bottom of the triple crucible to obtain a fiber having a triple configuration consisting of the core glass having a diameter of about 152$\mu$, the covering glass layer having a thickness of about 20$\mu$, and the acid-soluble glass layer having a thickness of about 4$\mu$. Thus, the acid-soluble glass layer is very thin. Therefore, when the glass viscosity at the fiber-forming temperature is low as in the case of the acid-soluble glass disclosed in Japanese Patent Publication No. 53(1978)-38623, Japanese Unexamined Patent Publication No. 57(1982)-38343 or 57(1982)-61643, it is necessary that the width of the outermost slit of the triple nozzle be extremely small. However, it is very difficult to make such a nozzle, and slight eccentricity of the nozzle causes the glass layer to break readily.

SUMMARY OF THE INVENTION

The primary object of the present invention is to provide an acid-soluble glass suitable for use in making a bundle of flexible optical fibers.

Another object of the present invention is to provide an acid-soluble glass which makes it possible to form an optical fiber bundle at a low cost.

The specific object of the present invention is to provide an acid-soluble glass containing a reduced amount of BaO and exhibiting a high viscosity at the fiber-forming temperature.

The acid-soluble glass for use in making a flexible optical fiber bundle in accordance with the present invention has the following composition:

20.0 mol % < $SiO_2$ < 48.0 mol %
25.0 mol % < $B_2O_3$ < 50.0 mol %
5.0 mol % ≦ BaO ≦ 6.0 mol %
7.0 mol % < $Na_2O$, $K_2O$, or $Li_2O$, or total of the two or more thereof < 18.0 mol %
71.0 mol % < $SiO_2$ + $B_2O_3$ + BaO < 80.0 mol %

The acid-soluble glass exhibits a sufficient solubility in an acid, a sufficient resistance to water, and a high viscosity at the fiber-forming temperature. Therefore, it is very suitable for making a flexible optical fiber bundle.

DETAILED DESCRIPTION OF THE INVENTION

In the present invention, the acid-soluble glass may further contain ZnO in an amount of 12.0 mol % or less. If the amount of $SiO_2$ is 20.0 mol % or less, the glass viscosity at the temperature at which a fiber having a triple configuration is drawn becomes low, and the yield greatly drops when a fiber exhibiting an extremely high dimensional accuracy, e.g. an optical fiber for an image guide, is to be formed. If the amount of $SiO_2$ is 48.0 mol or more, it becomes difficult to obtain a sufficient solubility of the glass in an acid. An amount of $B_2O_3$ of 25.0 mol % or less makes it difficult to obtain a sufficient solubility in an acid, and an amount thereof 50.0 mol % or more makes it difficult to obtain a sufficient resistance to water. If the amount of BaO is less than 5.0 mol %, it is impossible to obtain good solubility together with a sufficient water resistance. An amount of BaO more than 6.0 mol % makes it difficult to increase the glass viscosity at the fiber-forming temperature. When the amount of $Na_2O$, $K_2O$ or $Li_2O$, or the total of the two or more thereof is 7.0 mol % or less, the glass exhibits a too small thermal expansion coefficient. Conversely, when the amount thereof is 18.0 mol % or more, the thermal expansion coefficient of the glass becomes too large.

When the amount of $SiO_2$ + $B_2O_3$ + BaO is 71.0 mol or less, or is 80.0 mol % or more, it is difficult to obtain a sufficient water resistance while the glass viscosity at the fiber-forming temperature is kept high and a sufficient acid solubility is kept at a sufficient value. In order to minimize the viscosity changes due to a change in temperature, it is preferable that the acid-soluble glass in accordance with the present invention contains ZnO. However, if the amount of ZnO is more than 12 mol %, the glass is readily devitrified. In the present invention, the acid-soluble glass may further contain about 5 mol % or less of MgO, CaO or SiO, about 7 mol % or less of $Al_2O_3$, or a small amount of a colorant. It is also possible to add small amounts of $As_2O_3$, $Sb_2O_3$ and the like as fining agents.

Table 1 shows examples of the composition of the acid-soluble glass in accordance with the present invention. In Table 1, the transition point is the temperature at which the viscosity is about $10^{13}$ poise, and the flex point is the temperature at which the viscosity is in the range between $10^{11}$ and $10^{12}$ poise. The water resistance and the acid resistance (powder method) were determined as described below. Namely, a specimen was pulverized to a grain size within the range between 420$\mu$ and 590$\mu$, cleaned with methyl alcohol, and then dried. The specific gravity gram of the specimen particles were put into a platinum cage for dissolution. The platinum cage was then put into a round flask made of quartz glass and containing a test solution. The round flask was then heated on a boiling water bath for 60 minutes. The specimen particles were then dried, and the loss in weight of the specimen after drying was determined and expressed in percentage. The test solution for determination of the water resistance was distilled water having a pH value within the range between 6.5 and 7.5, and the test solution for determination of the acid resistance was 1/100 N nitric acid having a pH value of about 2.2.

TABLE 1

|  | 1 | | 2 | | 3 | | 4 | |
| --- | --- | --- | --- | --- | --- | --- | --- | --- |
|  | W | M | W | M | W | M | W | M |
| $Al_2O_3$ | 2.5 | 1.8 | 2.5 | 1.8 | 2.5 | 1.8 | 2.5 | 1.8 |
| $SiO_2$ | 32.5 | 38.6 | 30.0 | 35.7 | 27.5 | 32.9 | 27.5 | 32.7 |
| $B_2O_3$ | 33.0 | 33.8 | 35.5 | 36.5 | 38.0 | 39.3 | 39.3 | 40.3 |
| $Na_2O$ | 11.0 | 12.6 | 11.0 | 12.7 | 11.0 | 12.7 | 11.0 | 12.6 |
| BaO | 12.5 | 5.8 | 12.5 | 5.8 | 12.5 | 5.8 | 11.2 | 5.2 |
| ZnO | 8.5 | 7.4 | 8.5 | 7.5 | 8.5 | 7.5 | 8.5 | 7.4 |
| $SiO_2$ + $B_2O_3$ + BaO |  | 78.2 |  | 78.0 |  | 78.0 |  | 78.2 |
| Specific gravity |  | 2.76 |  | 2.75 |  | 2.73 |  | 2.69 |
| Refractive |  | 1.5481 |  | 1.5478 |  | 1.5475 |  | 1.5440 |

TABLE 1-continued

|  | 1 | 2 | 3 | 4 |
|---|---|---|---|---|
| index |  |  |  |  |
| V value | 61.0 | 61.1 | 61.2 | 61.4 |
| Transition point | 535° C. | 532° C. | 523° C. | 521° C. |
| Flex point | 570° C. | 564° C. | 560° C. | 558° C. |
| Thermal expansion coefficient ($\times 10^{-7}$ cm/cm · ° C.) | 84 | 83 | 87 | 85 |
| Water resistance (%) | 0.50 | 0.87 | 1.41 | 1.89 |
| Acid resistance (%) | 2.25 | 2.37 | 2.61 | 2.74 |

W = % by weight
M = mol %

We claim:

1. An acid-soluble glass for manufacturing a flexible fiber optical bundle consisting essentially of the following composition:
   20.0 mol % < $SiO_2$ < 48.0 mol %
   25.0 mol % < $B_2O_3$ < 50.0 mol %
   5.0 mol % ≦ BaO ≦ 6.0 mol %
   7.0 mol % < $Na_2O$, $K_2O$, or $Li_2O$, or total of the two or more thereof < 18.0 mol %
   71.0 mol % < $SiO_2 + B_2O_3 + BaO$ < 80.0 mol %
   7.4 mol % < ZnO < 12.0 mol %
   1.8 mol % < $Al_2O_3$ < 7 mol %.

2. An acid-soluble glass as defined in claim 1 further comprising not more than 5 mol % of at least one of MgO, CaO and SrO.

3. An acid-soluble glass as defined in claim 1 further comprising a colorant.

4. An acid-soluble glass as defined in claim 1 further comprising a fining agent.

5. An acid-soluble glass as defined in claim 4 wherein said fining agent is selected from thegroup consisting of $As_2O_3$ and $Sb_2O_3$.

* * * * *